May 2, 1950 — B. M. FRY — 2,506,205
CALF FEEDING DEVICE
Filed Jan. 13, 1948
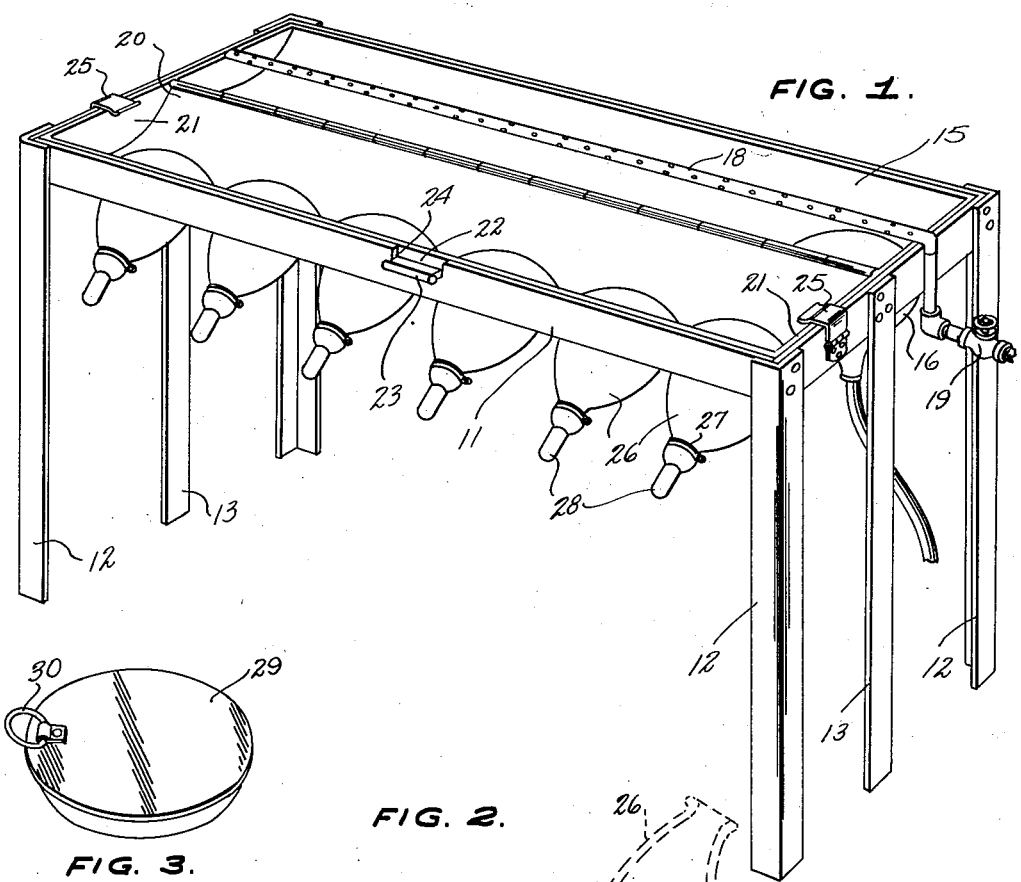
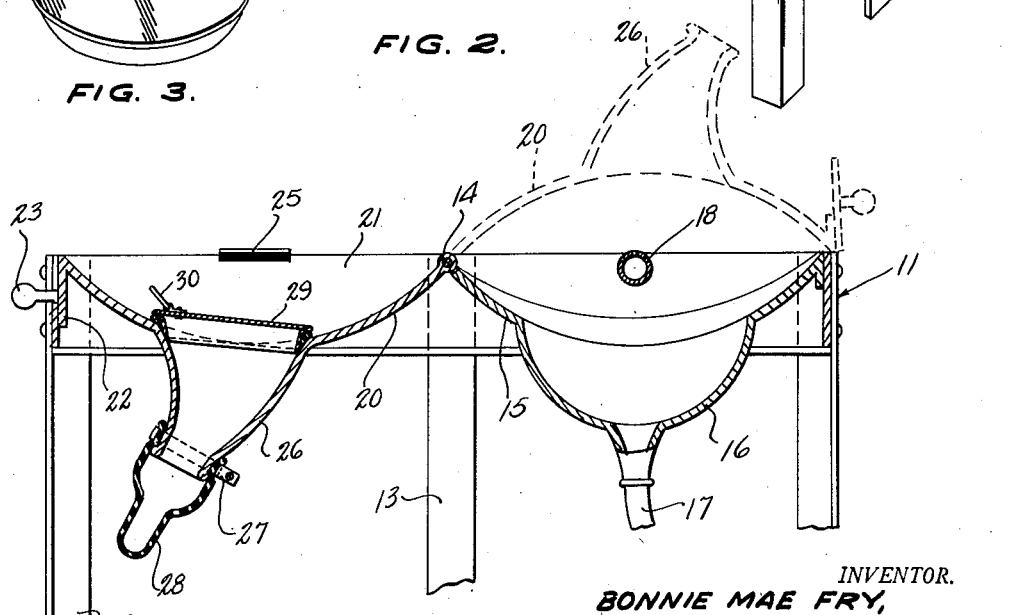
INVENTOR.
BONNIE MAE FRY,
BY McMorrow, Berman & Davidson
ATTORNEYS.

Patented May 2, 1950

2,506,205

UNITED STATES PATENT OFFICE 2,506,205

CALF FEEDING DEVICE

Bonnie Mae Fry, Shafter, Calif.

Application January 13, 1948, Serial No. 2,029

3 Claims. (Cl. 119—71)

This invention relates to stock feeding devices, and more particularly to a device for feeding milk to calves or other animals.

A main object of the invention is to provide a novel and improved stock feeding device which is very simple in construction, easy to regulate and which may be readily cleaned.

A further object of the invention is to provide an improved milk feeding device for calves or other animals which is inexpensive to manufacture, sturdy in construction and very sanitary.

Further objects and advantages of the invention will become apparent from the following description and claims, and from the accompanying drawings, wherein:

Figure 1 is a perspective view of an animal feeding device constructed in accordance with the present invention.

Figure 2 is a transverse vertical cross-sectional view taken through the feeding device of Figure 1.

Figure 3 is a perspective view of a removable stopper employed with the feeding device of Figure 1.

Referring to the drawings, 11 designates a rectangular frame provided at its corners with vertical supporting legs 12 and with depending vertical brace bars 13 at the intermediate portions of its ends. Connecting said intermediate portions is a longitudinal rod 14 and rigidly secured in the frame 11 between said rod and the rear side of the frame is a stationary concave trough 15 formed with an integral drain bowl portion 16 adjacent one end of the frame. Connected to the bottom of said drain bowl portion 16 is a drain hose 17.

Secured in the frame 11 in overlying relationship to the trough 15 is a longitudinally extending perforated pipe 18 connected at one end through a control valve 19 to a suitable water supply.

Hinged to rod 14 is a concave longitudinally extending trough 20 formed with end walls 21, 21 and formed at its front free longitudinal edge with a depending longitudinal flange 22. Secured to the intermediate portion of flange 22 is a handle 23 receivable in a notch 24 formed in the forward longitudinal side of frame 11, whereby trough 20 is supported in the full-line position shown in Figures 1 and 2. Pivotally secured to the ends of frame 11 are hook-like clamps 25, 25 adapted to overlie the top edges of the trough end walls 21, 21 to releasably secure the trough in said full-line position.

The trough 20 is formed with a plurality of longitudinally-spaced downwardly and outwardly inclined spouts or bowl 26, the spouts 26 being tapered in cross-section, as shown in Figure 2. Clamped to the bottom rim of each spout 26 by a metal band 27 is a nipple 28 of rubber or other suitable flexible material. Designated at 29 is a stopper fitting the top ends of the spouts 26. Stoppers 29 may be employed to close off such spouts as may not be required. Each stopper is provided with a pivoted handle ring 30 to facilitate removal and handling thereof.

In use, milk is placed in the trough 20 and the calves or other animals to be fed suck the milk through the nipples 28. Access to said nipples is facilitated due to the downward and outward inclination of the axes of the spouts 26.

When the apparatus is to be cleaned, the clamps 25 are rotated outwardly to released positions and the trough 20 is swung to the dotted-line position shown in Figure 2, overlying the stationary trough 15. Valve 19 is then opened, allowing water to spray from the perforated pipe 18 onto the inner surfaces of inverted trough 20, spouts 26 and nipples 28, cleansing said surfaces. The water drains off through drain hose 17.

While a specific embodiment of a stock feeding device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A calf feeding device comprising a frame having parallelly spaced front and rear horizontal members positioned at a substantial height above the ground, a fluid feed trough extending along said front horizontal member and having depending feeding nipples, a washing trough extending along said rear horizontal member and having a drain, said troughs being positioned within said front and rear horizontal frame members, a spray pipe supported lengthwise in said washing trough on a level with its top, and hinge means on said frame supportably connected to the rearward edge of said feed trough whereby said feed trough can be swung upwardly from its normal horizontal feeding position and rearwardly and downwardly to a position over said washing trough whereby fluid feed present in the feed trough is emptied into said washing trough, and in which position said feed trough and said washing trough can be cleansed by supplying water to said spray pipe.

2. A calf feeding device comprising a frame including parallelly spaced front and rear horizontal members positioned at a substantial height above the ground, a bar positioned between and parallel to said front and rear horizontal members, a drain trough stationarily supported between and from said rear member and said bar, a spray pipe extending along said drain trough, a feeding trough positioned between said front frame member and said bar, said feeding trough having a forward projection on its front edge freely and supportably engaging said front frame member in the horizontal feeding position of said feeding trough, hinge means on the rear edge of said feeding trough supportably engaging said bar, said hinge means being arranged to permit said feeding trough to be swung upwardly and rearwardly from its horizontal feeding position into a discharging position overlying said drain trough for discharging fluid feed present in said feeding trough into said drain trough, said hinge means further permitting said feeding trough to be swung downwardly to register with said drain trough in a position above said spray pipe whereby said spray pipe can be supplied with water to cleanse said feeding trough and said drain trough.

3. A calf feeding device comprising a frame including parallelly spaced front and rear horizontal members positioned at a substantial height above the ground, a bar positioned between and parallel to said front and rear horizontal members, a drain trough stationarily supported between and from said rear member and said bar, a spray pipe extending along said drain trough, a feeding trough positioned between said front frame member and said bar, said feeding trough having a forward projection on its front edge freely and supportably engaging said front frame member in the horizontal feeding position of said feeding trough, hinge means on the rear edge of said feeding trough supportably engaging said bar, said hinge means being arranged to permit said feeding trough to be swung upwardly and rearwardly from its horizontal feeding position into a discharging position overlying said drain trough for discharging fluid feed present in said feeding trough into said drain trough, said hinge means further permitting said feeding trough to be swung downwardly to register with said drain trough in a position above said spray pipe whereby said spray pipe can be supplied with water to cleanse said feeding trough and said drain trough, said feeding trough being concavo-convex in cross section and having downwardly tapered tubes formed in the bottom thereof at intervals, compressible feeding nipples secured on the lower ends of said tubes, and removable covers for closing the upper ends of selected ones of said tubes.

BONNIE MAE FRY.

REFERENCES CITED

The following references are of record in the file of this patent:

UNITED STATES PATENTS

| Number | Name | Date |
| --- | --- | --- |
| 998,973 | McCollough | July 25, 1911 |
| 1,385,510 | Ward | July 26, 1921 |
| 1,625,300 | Davis | Apr. 19, 1927 |